(12) United States Patent
Hirao et al.

(10) Patent No.: US 7,852,537 B2
(45) Date of Patent: Dec. 14, 2010

(54) OPTICAL RECORDING MEDIUM AND METHOD OF MANUFACTURING THE SAME

(75) Inventors: Akiko Hirao, Chiba-ken (JP); Kazuki Matsumoto, Kanagawa-ken (JP); Rumiko Hayase, Kanagawa-ken (JP); Norikatsu Sasao, Tokyo (JP); Takahiro Kamikawa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 283 days.

(21) Appl. No.: 11/854,914

(22) Filed: Sep. 13, 2007

(65) Prior Publication Data
US 2008/0254262 A1    Oct. 16, 2008

(30) Foreign Application Priority Data
Sep. 13, 2006  (JP) ............................. 2006-248591

(51) Int. Cl.
*G03H 1/02*    (2006.01)
(52) U.S. Cl. ................ 359/3; 430/1; 430/2; 430/271.1; 430/273.1
(58) Field of Classification Search ................ 428/64.4, 428/157; 359/3, 8; 430/1, 2, 271.1, 273.1
See application file for complete search history.

(56) References Cited

U.S. PATENT DOCUMENTS

| | | | | |
|---|---|---|---|---|
| 4,555,716 A | * | 11/1985 | Odawara et al. | 346/137 |
| 4,647,948 A | * | 3/1987 | Odawara | 346/137 |
| 4,713,314 A | * | 12/1987 | Namba et al. | 430/270.19 |
| 4,739,345 A | * | 4/1988 | Namba et al. | 346/137 |
| 4,853,260 A | * | 8/1989 | Kimura et al. | 427/240 |
| 5,126,996 A | * | 6/1992 | Iida et al. | 369/283 |
| 5,161,150 A | * | 11/1992 | Namba et al. | 369/275.4 |
| 5,698,344 A | | 12/1997 | Bai et al. | |
| 6,160,645 A | | 12/2000 | Chandross et al. | |
| 7,031,037 B2 | * | 4/2006 | Hirao et al. | 359/3 |
| 2002/0145772 A1 | | 10/2002 | Hegel | |
| 2005/0196679 A1 | | 9/2005 | Hayase et al. | |
| 2006/0014081 A1 | | 1/2006 | Hayase et al. | |
| 2006/0115740 A1 | | 6/2006 | Hayase et al. | |
| 2006/0215528 A1 | | 9/2006 | Hirao et al. | |

FOREIGN PATENT DOCUMENTS

| | | |
|---|---|---|
| EP | 1768120 | 3/2007 |
| JP | 02031349 | 2/1990 |

(Continued)

OTHER PUBLICATIONS

Japanese Office Action dated Nov. 6, 2009 corresponding to U.S. Appl. No. 11/854,914, filed Sep. 13, 2007.

(Continued)

*Primary Examiner*—Mark Ruthkosky
*Assistant Examiner*—Gerard T Higgins
(74) *Attorney, Agent, or Firm*—Turocy & Watson, LLP

(57) ABSTRACT

An optical recording medium includes a first substrate having a groove on the side of an outer peripheral portion thereof; a second substrate in contact with the first substrate in the outer peripheral portion; and a recording layer being disposed in a gap between the first substrate and the second substrate and forming a void in cooperation with the first substrate at the portion of the groove.

19 Claims, 8 Drawing Sheets

FOREIGN PATENT DOCUMENTS

| | | |
|---|---|---|
| JP | 2001-005368 | 1/2001 |
| JP | 2003178457 | 6/2003 |
| JP | 2004192699 | 7/2004 |
| JP | 2006184897 | 7/2006 |
| JP | 2006235364 | 9/2006 |
| WO | 2004019139 | 3/2004 |

OTHER PUBLICATIONS

European Search Report for EP 07 01 1039 dated Nov. 29, 2007 corresponding to U.S. Appl. No. 11/854,914, filed Sep. 13, 2007.

* cited by examiner

US 7,852,537 B2

OPTICAL RECORDING MEDIUM AND METHOD OF MANUFACTURING THE SAME

CROSS-REFERENCE TO RELATED APPLICATIONS

This application is based upon and claims the benefit of priority from the prior Japanese Patent Application No. 2006-248591, filed Sep. 13, 2006, the entire contents of which are incorporated herein by reference.

BACKGROUND

1. Technical Field

The present invention specifically relates to an optical recording medium in which information can be recorded by a hologram and information can be reproduced by an irradiating beam, and a method of manufacturing the same.

2. Description of the Related Art

A holographic data storage is a memory for recording information in a recording medium using holographic technology by overlapping a signal beam having image information and a reference beam in the interior of the recording medium and writing interference patterns generated at this time in the recording medium. The recorded information is read by irradiating the reference beam to the recording medium and obtaining the image information from diffraction caused by the interference patterns.

U.S. Pat. No. 5,698,344 discloses a holographic data storage and a holographic recording/reproducing medium for recording and reproducing information with respect thereto. In the holographic data storage, since the interference patterns are three-dimensionally written using the thickness of the recording medium, selectivity of the wavelength and the angle of beam is high, and hence multiplexing is enabled and high recording capacity is achieved. Since the image information can be read by one shot, it has an advantage such that the transfer rate of reproduced signals is high.

The image information to be recorded is generally encoded digital information. In order to reproduce, the recorded image information is reproduced and decoded to take out as information.

What is essential to be developed to achieve such a recording is a medium having a thick recording layer in which the interference patterns can be recorded three-dimensionally as described in JP-2001-5368.

The most-used photopolymer as a medium of the holographic data storage achieves recording by generating a density distribution, so that the volume of the recording layer is reduced by recording. When the ratio of volume reduction of the photopolymer is high, the method of reproduction must be thought out. For example, reproduction may be achieved by varying the angle of a disk with respect to reproducing beam or varying the position of a detector for the reproducing beam in the case of off-axis holographic recording, and by varying conversion conditions (e.g., decoding condition) of the intensity of the reproducing beam detected by the detector in the case of a coaxial holographic data recording.

When manufacturing the medium, there arises a problem such that the recording surface area on the medium is reduced in association with volume reduction of a precursor substance when solution as the precursor substance of the recording layer is cured.

In addition, recording characteristics of the photopolymer are deleteriously affected by oxygen or water in many cases. When the recording material can be isolated from oxygen or water, recording with higher density can be realized.

SUMMARY

The following presents a simplified summary in order to provide a basic understanding of one or more aspects of the invention. This summary is not an extensive overview of the invention. It is not intended to identify key or critical elements, nor to delineate the scope of the claimed subject matter. Rather, the sole purpose of this summary is to present some concepts of the invention in a simplified form as a prelude to the more detailed description that is presented hereinafter.

An optical recording medium according to an embodiment of the invention includes a first substrate having a groove on the side of an outer peripheral portion thereof; a second substrate in contact with the first substrate in the outer peripheral portion; and a recording layer being disposed in a gap between the first substrate and the second substrate and forming a void in cooperation with the first substrate at the portion of the groove.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following description when considered in conjunction with the drawings.

DETAILED DESCRIPTION

Figure 1:
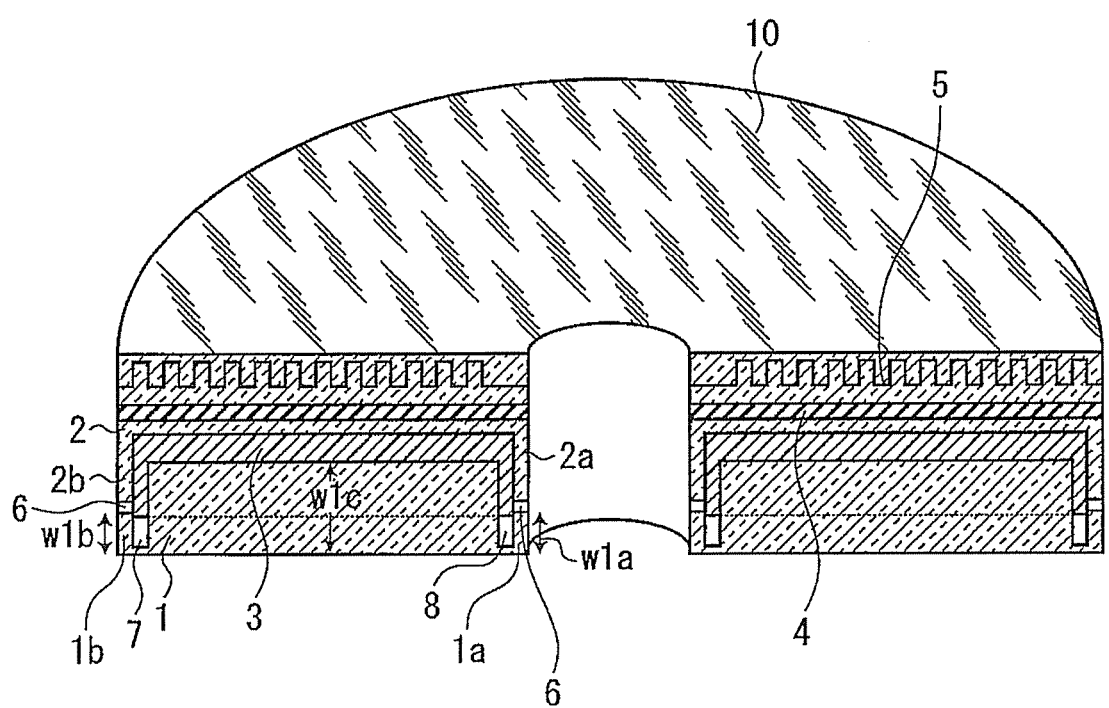
FIG. 1 is a vertical cross-sectional view of an optical disk according to Example 1 in one aspect of the invention.

Referring now to the drawings, an embodiment of the invention will be described in detail.

Figure 2:
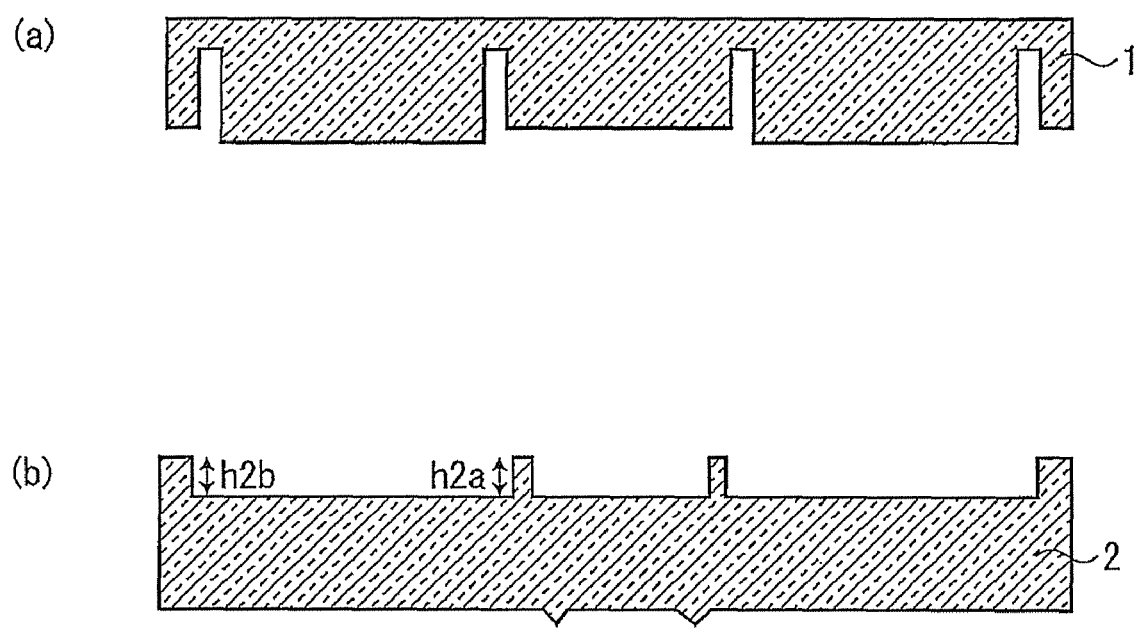
FIGS. 2(a) and 2(b) are vertical cross-sectional view of a first substrate and a second substrate which constitute the optical disk in FIG. 1.
Figure 3:
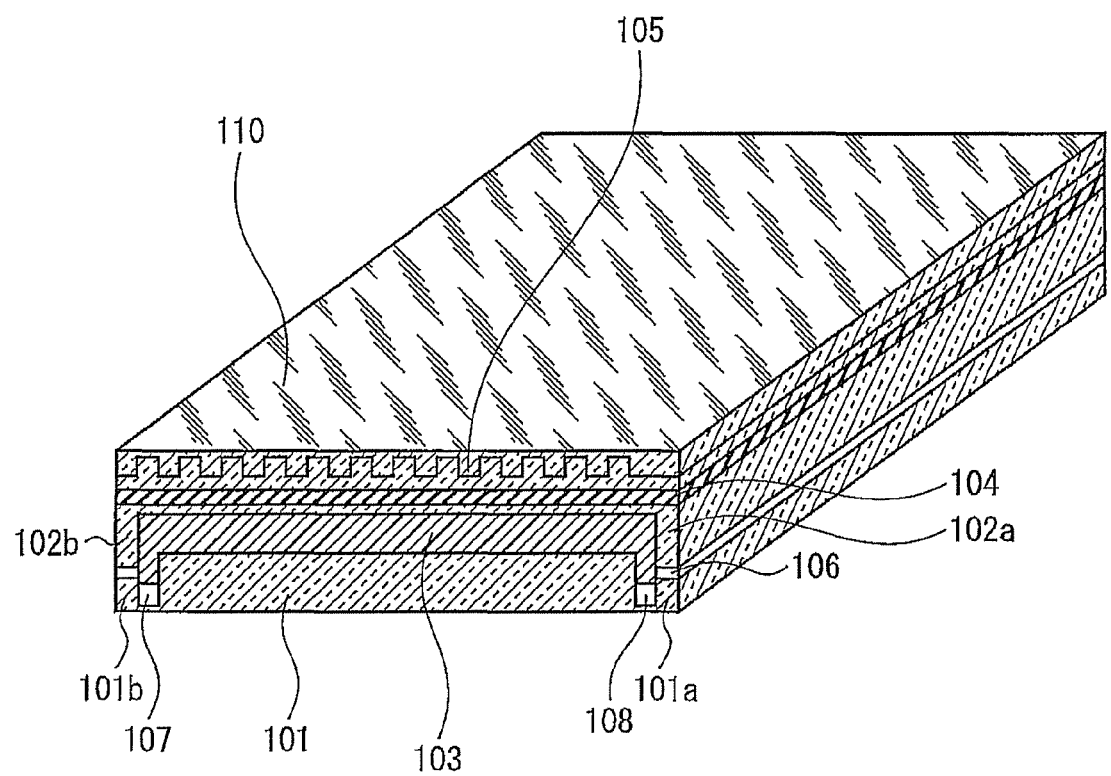
FIG. 3 is a vertical cross-sectional view of a card-type medium as Example 2 in another aspect of the invention.
Figure 4:
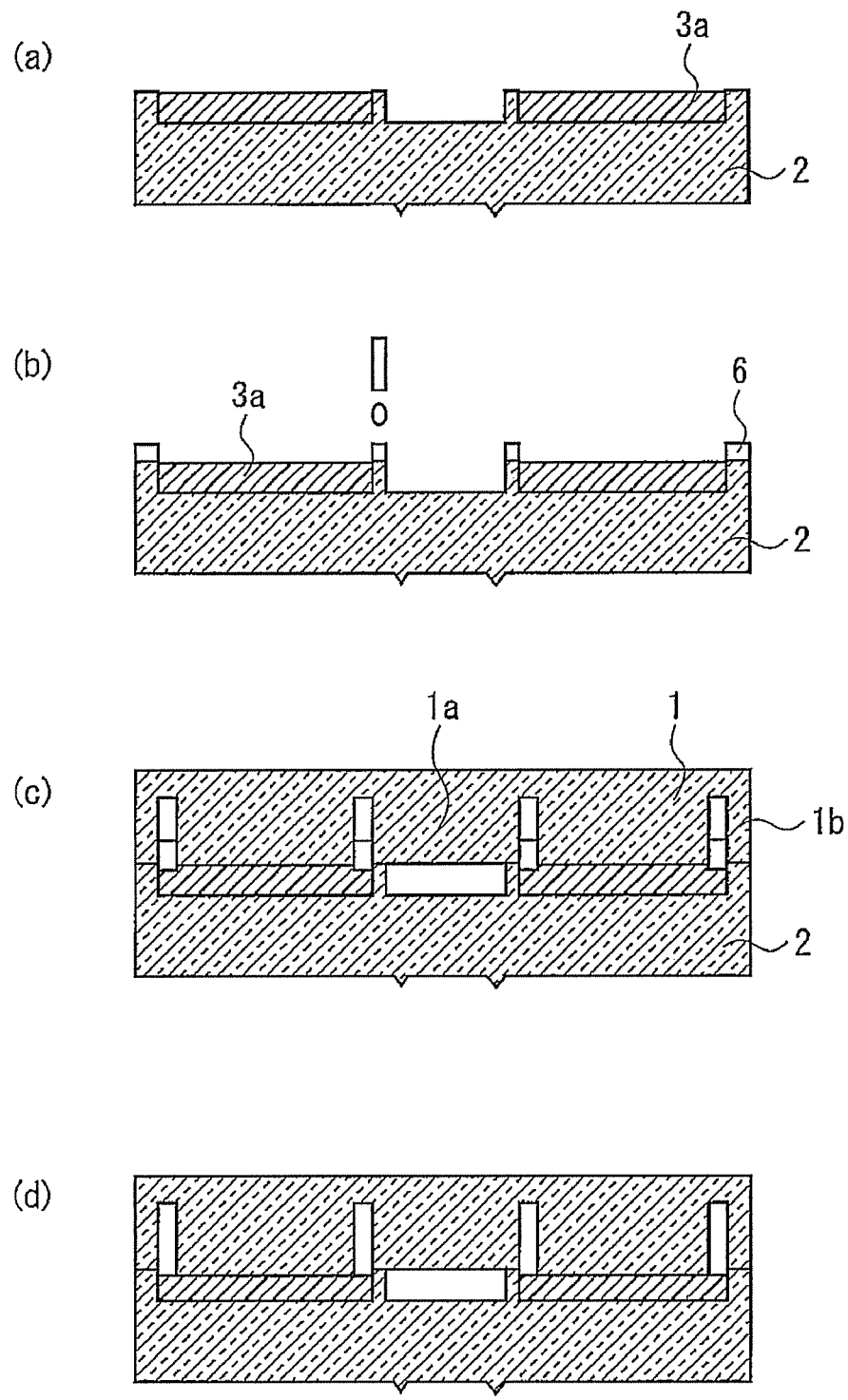
FIGS. 4(a), 4(b), 4(c) and 4(d) show a method of manufacturing the optical disk in Example 1 in one aspect of the invention.

FIG. 1 is a vertical cross-sectional view of an optical disk as an example of an optical recording medium according to the invention and FIGS. 2(a) and 2(b) are vertical cross-sectional views of a first substrate and a second substrate which constitute the optical disk in FIG. 1. The optical disk in FIG. 1 can be used, for example, for coaxial recording/reproducing system. FIG. 3 is a vertical cross-sectional view of a card-type medium as Example 2 of the invention. FIG. 4 illustrates a method of manufacturing the optical disk, for example, shown in FIG. 1.

EXAMPLE 1

The optical disk in FIG. 1 is a medium in which a large quantity of data can be recorded as hologram. As shown in FIG. 1, the optical disk includes a first substrate 1 positioned on the beam-incident side and a second substrate 2 positioned so as to oppose the first substrate 1.

FIGS. 2(a), 2(b) are cross-sectional views of the first substrate 1 and the second substrate 2, respectively. The first substrate 1 includes grooves 7 and 8 respectively on the sides of an inner peripheral portion 1a and an outer peripheral portion 1b. As an example, when the diameter of the first substrate is approximately 120 mm and the thickness $w_{1c}$ of a portion between the inner peripheral portion and the outer peripheral portion is approximately 1.07 mm, the thickness $w_{1a}$ of the inner peripheral portion 1a and the thickness $w_{1b}$ of the outer peripheral portion 1b are approximately 1 mm. Also in this example, the depth of the groove is approximately 0.5 mm, and the width of the groove is approximately 2 mm.

The second substrate 2 includes projections 2a, 2b on the inner peripheral portion and the outer peripheral portion thereof. As an example, when the diameter of the second substrate is approximately 120 mm, the diameter of the first substrate is approximately 120 mm, and the thickness $w_{1c}$ of the portion between the inner peripheral portion and the outer peripheral portion is approximately 1.07 mm, the heights $h_{2a}$, $h_{2b}$ of the projections are approximately 0.27 mm.

As shown in FIG. 1, a space is defined by sealing or bonding together the distal end of the inner peripheral portion 1a and the distal end of the projection 2a with an adhesive agent, and a recording layer 3 is formed in this space (the space between the first substrate 1 and second substrate 2). The recording layer 3 does not fill the entire space, as voids 7 and 8 are formed in the inner peripheral portion 1a and the outer peripheral portion 1b.

A wavelength adjusting layer 4 may be formed on a surface of the second substrate 2 opposite from a surface which is in contact with the recording layer 3. The wavelength adjusting layer 4 or the space may have any suitable thickness. In one embodiment, the thickness of the wavelength adjusting layer 4 or the space is from about 1 nm to about 200 nm. In another embodiment, the thickness of the wavelength adjusting layer 4 or the space is from about 5 nm to about 50 nm, such as about 20 nm. A reflecting-layer-mounted address-pit 5 including mirror surfaces for recording beam may be formed over the wavelength adjusting layer 4.

Subsequently, the materials which form the optical disk are described.

The first substrate 1 and the second substrate 2 may be formed of any suitable optical disk materials. General examples of optical disk materials include polymeric materials. Specific examples include vinyl polymers, polycarbonates, polyarylates, amorphous polyolefins such as norbornene systems, polymethyl methacrylates, cellulose acetate butyrates, polystyrene methyl methacrylates, epoxy resins, and so on. The first substrate 1 and the second substrate 2 may be formed of the same material or different materials. The first substrate 1 and the second substrate 2 are preferably low in absorption of the beam used for recording and are low in birefringence and, in particular, are preferably formed of a low birefringence polycarbonate or a low birefringence amorphous polyolefin.

The material of the recording layer 3 is a light-cured hologram recording material referred to as photopolymer. In one embodiment, the photopolymer is an organic photopolymer. The material of the recording layer 3 changes in density by the act of recording. The photopolymer generally includes a free-radical polymerization compound, an optical-radical polymerization initiator and a matrix material. The photopolymer may optionally include one or more of an acid-forming agent, a radical-forming agent, a pigment, oligomer, a volume expanding agent, and the like.

The free-radical polymerization compound preferably includes an acrylate group (preferably an acrylate compound), such as iso-bornyl acrylate, phenoxy-ethyl acrylate, diethyl glycol monoethyl ether acrylate, ethyl acrylate, vinyl benzoate, or vinyl naphthoate. The free-radical polymerization compound may have a portion of the hydrogen atoms thereon replaced with chlorine atoms (a chlorinated acrylate compound). The free-radical polymerization compound may have various substitutional groups such as a group including silicon for enhancing the index difference. Examples of acrylate compounds with silicon-containing substituents include (trimethylsilyloxy) dimethylsilyl propyl acrylate, (perfluoroxyl) methyl acrylate, and the like. Another example of a free-radical polymerization compound is N-vinyl carbazole.

The photopolymer may contain one free-radical polymerization compound, or may contain two or more free-radical polymerization compounds. In one embodiment the photopolymer contains from about 5 wt % to about 50 wt % of the free-radical polymerization compound. In another embodiment, the photopolymer contains from about 10 wt % to about 40 wt % of the free-radical polymerization compound.

The optical-radical polymerization initiator initiates a polymerization reaction by absorbing a light beam. Examples of optical-radical polymerization initiators include bis(2,6-difluoro-3-pyrrolphenyl) titanocene, bis(η5-cyclopentadienyl)bis(pentafluorophenyl)titanium (IV), and the like. The photopolymer contains a suitable quantity of the optical-radical polymerization initiator to effect polymerization in the photopolymer. The specific amount of the optical-radical polymerization initiator may be selected as needed according to the wavelength of recording beam, the film thickness of the recording layer, the quantity of beam absorption of the optical-radical polymerization initiator and so on. In one embodiment, the photopolymer contains from about 0.1 wt % to about 5 wt % of the optical-radical polymerization initiator. In another embodiment, the photopolymer contains from about 0.25 wt % to about 4 wt % of the optical-radical polymerization initiator.

Examples of matrix materials include vinyl polymers such as polyvinyl acetate having an ester group, polycarbonates, polyalylates, norbornene system resins, polymethylmethacrylates, cellulose acetate butyrates, polystyrenemethylmethacrylates, epoxy resins, and the like. In one embodiment, the photopolymer contains from about 20 wt % to about 80 wt % of one or more matrix materials. In another embodiment, the photopolymer contains from about 30 wt % to about 70 wt % of one or more matrix materials.

The optional components contained in the recording layer may be one or more of an acid-forming agent, a free-radical forming agent, a pigment, an oligomer and the like as described above. These optional substances typically can achieve desired effects if contained in an amount on the order of about 0.1 wt % or less with respect to the total amount of recording layer. In some instances, the sensitivity of the recording layer may be lowered if the amount of optional components is too high. In one embodiment, the recording layer contains from about 0.001 wt % to about 0.1 wt % of any given optional component. In another embodiment, the recording layer contains from about 0.0025 wt % to about 0.075 wt % of any given optional component. In yet another embodiment, the recording layer contains from about 0.001 wt % to about 0.1 wt % of all optional components.

Examples of acid-forming agent include aryl disonium salts, diaryl iodonium salts, triaryl sulfonium salts, triaryl selenonium salts, dialkylphenacyl sulfonium salts, sialkyl-4-hydroxyphenyl sulfonium salts, sulfonic acid ester, iron arene compound, and the like.

Examples of the free-radical forming agent include aromatic carbonyl compounds, in particular, $\alpha,\alpha$-dimetoxy-$\alpha$-phenyl acetophenone, and the like.

Examples of the pigment include azido system compound, 5-nitroacenaphthene, 1,2-benzanthraquinone, 1-nitro-4-acetylaminonaphthalene, methylene blue, safranine O, malachite green, cyanine colorant, rhodamine colorant, and the like.

Examples of the oligomer include multifunctional resins such as acrylate resin or epoxy resin having functional groups at both ends of a main chain of free-radical polymerization compound after polymerization, and the like.

The wavelength adjusting layer 4 preferably has a high reflection factor for the recording beam and a high coefficient of transmission for the servo beam. In other words, the wavelength adjusting layer has the ability to process light of different wavelengths differently.

For example, when a beam having a wavelength on the order of about 405 nm is used for the recording beam and a red beam having a wavelength on the order of about 670 nm is used for a servo beam, the wavelength adjusting layer 4 is preferably reflects the beam having a wavelength of about 405 nm and transmits the beam having a wavelength of about 670 nm. For example, the wavelength adjusting layer may contain a dichroic mirror which is a beam selecting and transmitting film having a multi-layer construction including one or more layers of a high refractive index material and one or more layers of a low refractive index material. Examples of high refractive index materials include $TiO_2$ and $ZnO_2$. Examples of low refractive index materials include $SiO_2$. As another example, a wavelength adjusting layer 4 formed by coating a pigment which is specifically high in reflecting factor for blue color may also be employed.

In one embodiment, the wavelength adjusting layer reflects a light having a first wavelength and transmits light having a second wavelength, the first wavelength and the second wavelength differing by about 250 nm or more. In another embodiment, the wavelength adjusting layer reflects a light having a first wavelength and transmits light having a second wavelength, the first wavelength and the second wavelength differing by about 150 nm or more.

The reflecting-layer-mounted address-pit 5 is formed, for example, to have a concavo-convex structure so as to perform a tracking servo and a focusing servo by the servo beam, and includes information for performing the tracking servo and address information recorded therein in advance. A conventional method may be applicable for generating a tracking error, performing tracking servo, generating focusing error and focusing servo. Although it is preferable to use a continuous servo system to perform the tracking servo, a sampled servo system may also be used. For example, a wobble pit can be employed for performing the tracking servo.

General examples of materials suitable for use as the adhesive agent 6 include a material initially in the liquid-state. More specific examples of materials suitable for use as the material of the adhesive agent 6 include UV-curable adhesive agents or thermally curable adhesive agents.

The pressure in the voids 7 and 8 may be about the same as atmospheric or preferably lower than atmospheric pressure. The voids 7 and 8 may include one or more of atmospheric air, nitrogen, and/or noble gases such as helium, neon, argon, and xenon.

The optical disk in Example 1 must simply have a flat-shaped recording area (that is, a substantially planar recording area). The shape of the entire disk is irrelevant and not critical to the invention. For example, the optical disk in Example 1 has a circular shape, but can also have a triangular shape, a square shape, a rectangular shape, a partially circular-partially straight edge shape, or a hexagonal shape. The optical disk may have any suitable size for recording information. For example, the optical disk may have a size like a business card and including a disk-shaped recording area. In one embodiment, the size of the optical disk is from about 1 cm2 to about 400 cm2. In another embodiment, the size of the optical disk is from about 4 cm2 to about 100 cm2.

The optical disk may be a medium having a cover layer, a recording layer, a gap layer, a reflecting layer, a servo layer, and a base layer laminated in this order from the beam-incident surface (the cover layer being the beam-incident surface). The first substrate 1 in FIG. 1 corresponds to the cover layer, the second substrate 2 corresponds to the gap layer, the wavelength adjusting layer 4 corresponds to the reflecting layer, the reflecting-layer-mounted address-pit 5 corresponds to the servo surface, and a third substrate 10 corresponds to the base layer. The cover layer and the gap layer transmit the recording beam. The servo surface is formed with an emboss pit, a land-and-groove, a wobble pit, and the like for performing the focus servo and the tracking servo.

Referring now to FIG. 4, a method of manufacturing the optical disk according to Example 1 is described.

As shown in FIG. 4($a$), 24 ml of a recording layer precursor solution 3$a$ is filled between the projections 2$a$ and 2$b$ formed on the second substrate 2. The recording layer precursor solution is prepared in the following manner. Firstly, vinyl-carbazole 11.58 g and vinylpyrrolidone 6.6 g are mixed, and then IRGACURE 784 (Chiba Specialty Chemicals LTD.) 0.3 g is added and stirred. After having dissolved completely, PERBUTYL H (NOF Corporation) 0.12 g is mixed to prepare monomer solution A. Subsequently, 1,4-butanediol diglycidylether 30.3 g and diethylenetriamine 10.8 g are mixed to prepare epoxy solution B. Then, the monomer solution A 4.5 ml and the epoxy solution B 25.5 ml are mixed and defoamed to obtain a precursor substance of the optical recording medium.

Subsequently, as shown in FIG. 4($b$), the adhesive agent 6 (for example, acrylic UV cured adhesive agent NOA 77 manufactured by NORLAND) is dropped onto the distal ends of the projections 2$a$, 2$b$.

After having dropped the adhesive agent 6, the first substrate 1 and the second substrate 2 are bonded together by bonding the distal ends of the projections 2$a$, 2$b$, with the distal end portions of the inner peripheral portion 1$a$ and the outer peripheral portion 1$b$ of the first substrate 1 as shown in FIG. 4C. When the first substrate 1 and the second substrate 2 are bonded together, a space is defined between the surface of the first substrate 1 and the surface of the second substrate 2 as shown in FIG. 4($c$). The capacity of the space is on the order of 5 ml. When bonding the first substrate 1 and the second substrate 2 together, approximately 4.8 ml of the recording layer precursor solution remains in the space.

The volume of the recording layer precursor solution remaining in the space after bonding the first and second substrates is less than the volume of the space. Similarly, the volume of the cured recording layer is less than the volume of the space. In one embodiment, the recording layer precursor solution or the cured recording layer fills about 99.5% or less of the volume of the space. In another embodiment, the recording layer precursor solution or the cured recording layer fills about 99% or less of the volume of the space. In yet another embodiment, the recording layer precursor solution or the cured recording layer fills about 97% or less of the volume of the space.

Subsequently, as shown in FIG. 4(d), the adhesive agent 6 is cured by irradiating with UV light or heating. In one embodiment, the recording layer precursor solution 3a is simultaneously cured. In another embodiment, the recording layer precursor solution is cured in a separate act distinct from curing the adhesive agent 6.

In one embodiment of the manufacturing method shown above, the process of bonding the first substrate 1 shown in FIG. 4(c) is performed in vacuum or in a depressurized inert gas. As a result, the pressure in the space is lower than atmospheric pressure. The recording layer precursor substance is converted into the recording layer 3 by being cured under room temperature or by heat. At this time, since the recording layer precursor solution remaining in the space between the first substrate 1 and the second substrate 2 contracts in volume during the curing process, the voids 7 and 8 are formed at the ends of the recording layer 3 in the space formed between the first substrate 1 and the second substrate 2.

The depth or volume of the voids 7 and 8 can be selected and controlled according to the sensitivity of the recording layer, the diffraction efficiency of the recording layer, the optical concentration of the recording layer, the multiplexing of recording, the sensitivity of the detector, and so on. In one embodiment, the depth is in the range from about 200 μm to about 5000 μm. In another embodiment, the depth is in the range from about 500 μm to about 2500 μm.

Subsequently, the optical recording/reproducing device for performing recording and reproduction in the optical disk according to Example 1 is described as follows.

Figure 5:
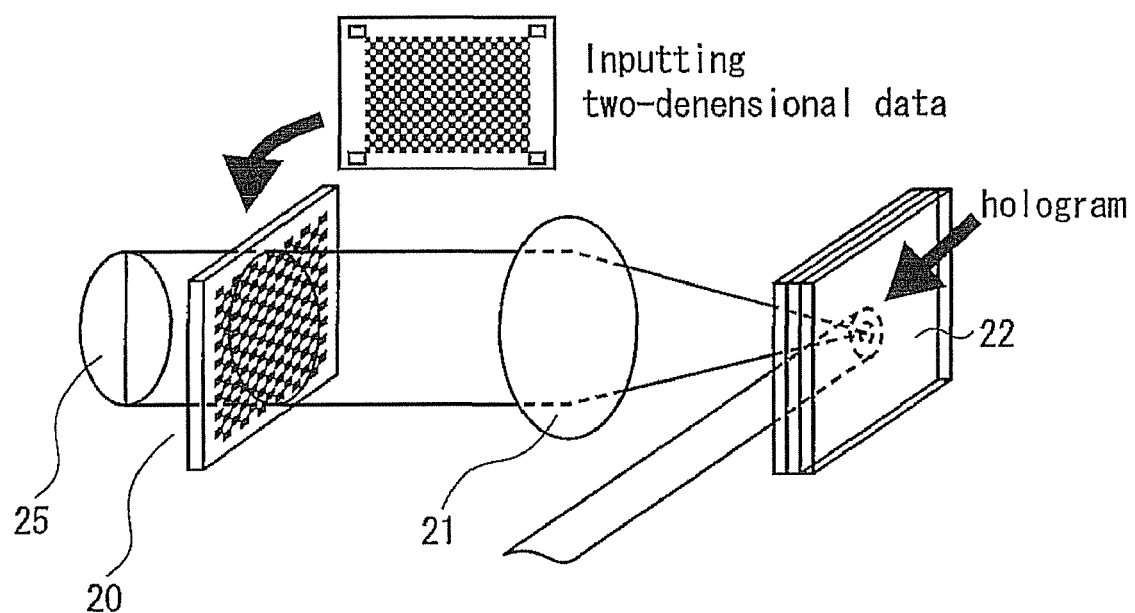
FIG. 5 shows an off-axis holographic recording/reproducing device and a recording process.
Figure 6:
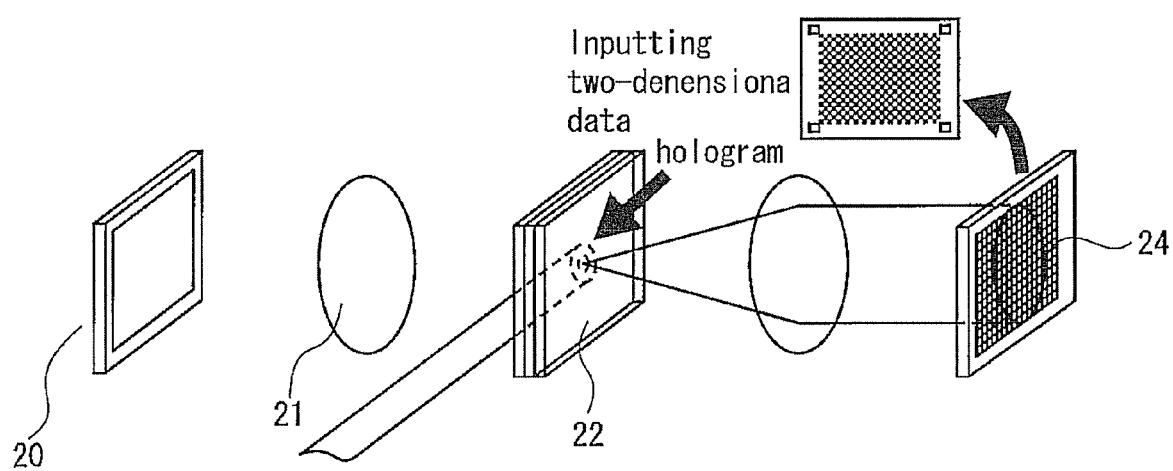
FIG. 6 shows the off-axis holographic recording/reproducing device and a reproducing process.
Figure 7:
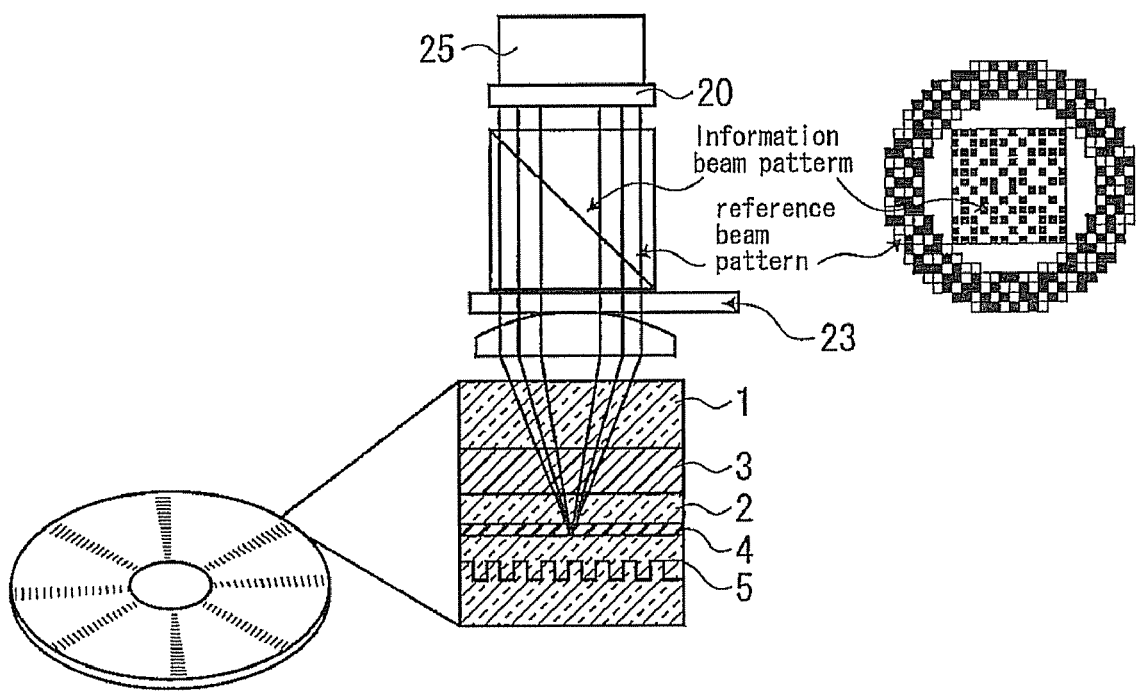
FIG. 7 shows a coaxial holographic recording/reproducing device and a recording process.
Figure 8:
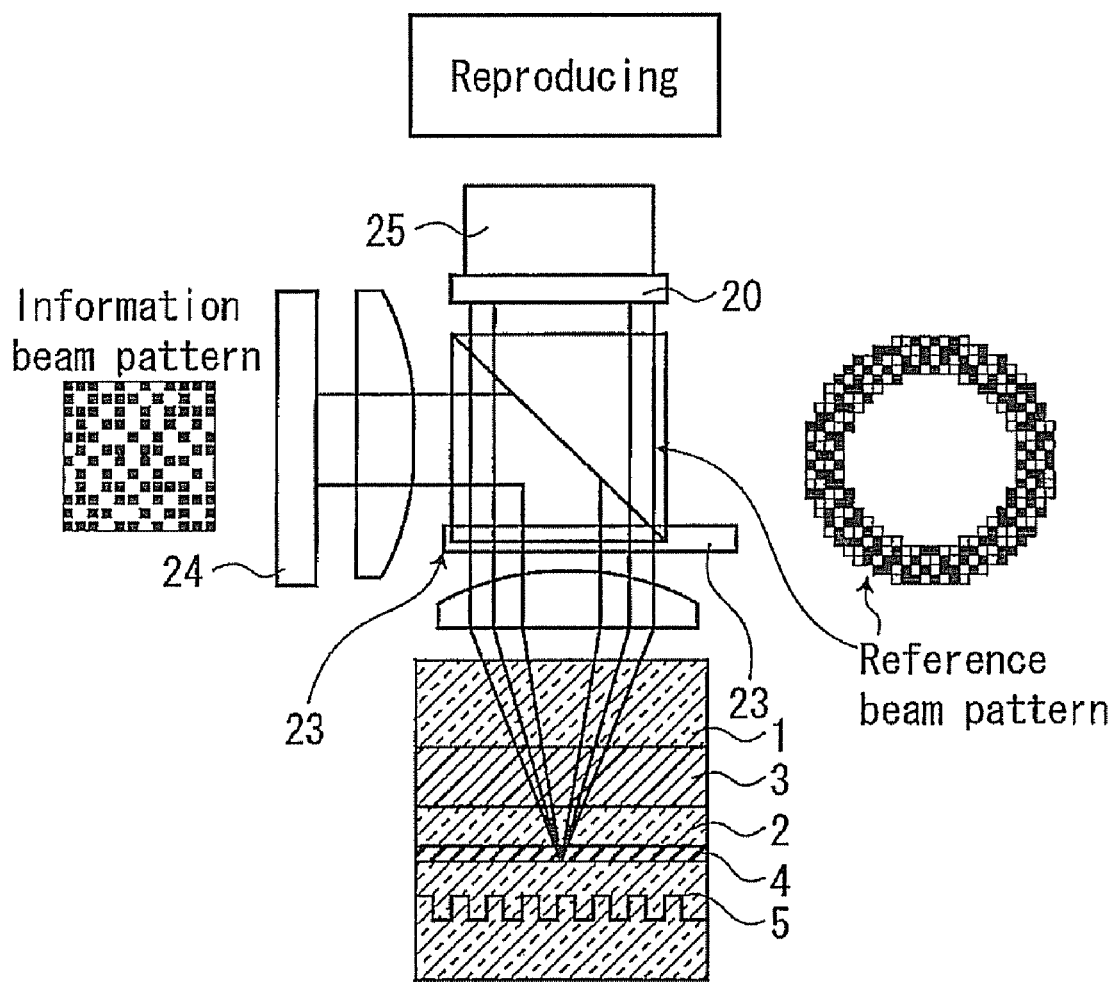
FIG. 8 shows the coaxial holographic recording/reproducing device and a reproducing process.

FIG. 5 and FIG. 6 illustrate an off-axis holographic recording/reproducing device for performing recording and reproduction on the optical disk in this example and a process of recording and reproduction. FIG. 7 and FIG. 8 illustrate a coaxial holographic recording/reproducing device for performing recording and reproduction on the optical disk in this example and the process of recording and reproduction. In both of these recording/reproducing devices, a spatial light modulator for providing a beam with information, a mechanism for forming an interference pattern for recording, a beam detector array for detecting a reproduced image, and a laser beam source are typically necessary.

Subsequently, the spatial light modulator, the interference pattern forming mechanism, the detector array, the laser beam source, and other structures are described in greater detail.

(1) Spatial Light Beam Modulator

The spatial light modulator is arranged on an optical path of a beam, and has pixels two-dimensionally arranged for spatially modulating the beam. For example, in the case of the coaxial system, the spatial light modulator divides a beam passing therethrough into a signal beam area positioned in the central portion thereof and a reference beam area in the peripheral portion. The term "spatially modulate" means to modulate the amplitude, the phase, the polarization, and the like.

The pixels arranged in an irradiating point in the central portion are normally arranged two-dimensionally in a lattice pattern, and correspond to digital information to be recorded in the optical disk. The digital information displayed on these pixels corresponds to the quantity of information per page; that is, the quantity of information which can be recorded on the optical disk by one shot of irradiation.

In the case of the transmissive spatial light modulator, an irradiating point in the peripheral portion may be formed with a pattern drawn by varying the coefficient of transmission of the beam. In the case of the reflective spatial light modulator, an irradiating point in the peripheral portion may be formed with a pattern drawn by varying the reflecting factor of the optical beam. A transmissive liquid crystal panel or the like may be employed as the transmissive spatial light modulator, and a reflective liquid crystal panel, a DMD (Digital Mirror Device) and the like may be employed as the reflective spatial light modulator.

In the transmissive liquid crystal panel, liquid crystal molecules can be polarized per pixel. The coefficient of transmission for the beam is adjusted by the polarization of the liquid crystal molecules. The reflective liquid crystal panel is the same as the transmissive liquid crystal panel except that the beam reciprocates in the liquid crystal panel. In the DMD, reflection can be adjusted into two directions by using mirrors provided in the respective pixels. By adjusting the direction of reflection of the mirror, a dark state and a light state are made. The mirror rotates around a hinge by an electrostatic attracting force between the mirror and a memory cell provided under the mirror. Normally, the rotation of this mirror is limited by a mechanical stopper to approximately ±10°.

(2) Interference Pattern Forming Mechanism

The interference pattern forming mechanism is arranged on the optical path of the beam and serves to make the reference beam interfere with the signal beam on the optical path from the above-described spatial light modulator on.

More specifically, for example, a ¼ wave plate 23 and an imaging lens 21 are exemplified as the interference pattern forming mechanism.

(3) Detector Array

A detector array 24 is arranged at an end of the optical path of the signal beam, and in particular, to detect the beam at the time of reproduction.

(4) Laser Beam Source

As a laser beam source 25, for example, a gas laser such as laser diode, He—Ne laser, Ar laser and the like and a solid laser such as YAG (LD excitation Nd: YAG laser $Nd^{3+}$: $Y_3Al_5O_{12}$) laser, and the like may be employed.

When forming the interference patterns using the optical path difference between the recording beam and the reference beam, a beam provided with a coherence length longer than the optical path difference is used. For public use, since the optical path difference is assumed to be at least about 1 mm, the coherence length is preferably at least about 1 mm. It is also possible to feedback the beam, as needed, in order to elongate the coherence length.

(5) Others

The optical recording/reproducing device may have a drive mechanism and/or a control mechanism in addition to the structures described above.

Subsequently, an optical recording/reproducing experiment using the optical disk shown in FIG. 1 is described in detail. This experiment is performed using the coaxial holographic recording/reproducing device shown in FIG. 6 and FIG. 7.

As shown in FIG. 1, the third substrate 10 having the wavelength adjusting layer 4 and the reflecting-layer-mounted address-pit 5 is bonded to the second substrate 2.

The reflecting layer in the reflection-layer-mounted address-pit 5 is manufactured by forming a film made of spattering AgNdCu and having a thickness of 200 nm on the surface of the third substrate 10. In addition, a transparent film (not shown) and having a thickness of 100 nm is manufactured to spatter $SiO_2$ on the reflecting film. The wavelength adjusting layer 4 which transmits a red beam and reflects a blue beam is further provided upon the third substrate 10.

The photopolymer forming the recording layer 3 is manufactured as shown below.

1,6-hexyandiol diglycidylether (epoxy equivalent 151, Nagase ChemteX Corporation) 45.3 g as diglycidylether and diethylenetriamine 10.14 g as amine are mixed to obtain polymer matrix precursor solution. On the other hand, N-vinylcarbazole 4.63 g as the free-radical polymerization compound, N-vinylpirrolidone 2.67 g as the free-radical polymerization compound and IRGACURE 784 (Chiba Specialty Chemicals LTD.) 0.168 g as the optical-radical polymerization initiator are mixed to prepare a monomer solution. Then, polymer matrix precursor solution 24 g and monomer solution 6 g are mixed and deformed to obtain a photopolymer precursor substance.

As shown in the method of manufacturing the optical disk described above, the obtained photopolymer precursor substance 24 ml is filled between the projections 2a, 2b formed on the second substrate 2 as shown in FIG. 4(a), and an adhesive agent (acrylic UV cured adhesive agent NOA 77 manufactured by NORLAND) is dropped on the distal ends of the projections 2a, 2b. The first substrate is bonded to the distal ends of the projections 2a, the first substrate 1 is designed so that the surface of the first substrate 1 is positioned lower than the liquid level of the recording layer precursor solution 3a when bonding with the second substrate 2. As shown in FIG. 4(c), a space is formed between the surface of the first substrate 1 and the surface of the second substrate 2, and the capacity of the space in this example is about 5 ml. When the first substrate 1 and the second substrate 2 are bonded together, approximately 4.8 ml of recording layer precursor solution remains in the space.

Subsequently, the adhesive agent 6 is cured by irradiating with UV light or heating.

The process of bonding the first substrate 1 is performed in a vacuum. Therefore, the resultant pressure in the space is lower than atmospheric pressure. The recording layer precursor solution 3a is converted into the recording layer 3 by a blocking beam and held at room temperature (about 25° C.) for 24 hours. At this time, since the recording layer precursor solution 3a charged into the space contracts in volume during the curing process, the volume of the recording layer 3 is reduced so that the volume of the recording layer is smaller than that the volume of the recording layer precursor solution 3a and hence voids 7 are generated at distal ends of the space. The portion where the recording layer 3 does not exist is not generated in the space other than the void 7. While not wishing to be bound by any theory, it seems that even though the material of the recording layer 3 tends to contract, since the pressure in the void is lower than atmospheric pressure, the degree of contraction is controlled not to be excessive.

The device used for the recording and reproduction is the coaxial system as shown in FIG. 7 and FIG. 8 as described above.

The laser beam source, for example, is a laser diode of 407 nm in wavelength and 30 mW in power. A DMD (Digital Micromirror Device) is used as the spatial light modulator. The beam which is reflected from the spatial light modulator is expanded to 2.5 mm in radius. An area having a radius smaller than 2 mm from the center of the beam is set to be a signal beam area, and an area having a radius from 2 mm to 2.5 mm from the center is set to be a reference beam area. At this time, the signal beam area has an information capacity of about 50 k bit.

A beam is irradiated on the recording medium so that a waist portion of the beam where the beam is squeezed most comes to the wavelength adjusting layer 4. Different information is recorded from page to page (which are different from each other) by shift multiplexing with the shift distance of about 5 μm using the CLV (Constant Linear Velocity) system.

An experiment is performed to reproduce the recording medium using a beam power equivalent to that at the time of recording, the bit error rate is on the order of about $10^{-5}$ or less.

EXAMPLE 2

Subsequently, Example 2 of the invention is described as below. Example 2 is a card-type medium as shown in FIG. 3. As shown in FIG. 3, the card-type medium includes a first substrate 101 positioned on the beam-incident side and a second substrate 102 facing the first substrate 101 in a generally similar manner as the optical disk in Example 1.

A space sealed by an adhesive agent 106 for bonding the distal ends of the peripheral projections 101a and 101b and the distal end of a projection 102a together is formed between the first substrate 101 and the second substrate 102, and the recording layer 103 is formed in this space. The recording layer 103 does not fill the entire space, and voids 107 and 108 are present at the distal ends of the space.

A wavelength adjusting layer 104 of suitable thickness, such as about 20 nm, is formed on the surface of the second substrate 102 opposite from a surface which is in contact with the recording layer 103. A reflecting-layer-mounted address-pit 105, together with the wavelength adjusting layer serves as a mirror for the recording beam, is formed over the wavelength adjusting layer 104.

Subsequently, the material which constitutes the card-type medium is the same as the material of the optical disk in Example 1, and hence the description is omitted for brevity.

With respect to any figure or numerical range for a given characteristic, a figure or a parameter from one range may be combined with another figure or a parameter from a different range for the same characteristic to generate a numerical range.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A card-type holographic recording medium comprising:
a first substrate comprising a first face and a peripheral groove formed on the first face, the peripheral groove being formed along the periphery of the first substrate to divide the first face into a center portion and an edge portion;
a second substrate comprising: a second face and
a peripheral projection that is adhered to the edge portion of the first face of the first substrate; and
a holographic recording layer filled between the first face of the first substrate and the second face of the second substrate, wherein a void is formed between the holographic recording layer and the first substrate within the peripheral groove, wherein the first substrate is configured to have a first thickness at the center portion and a second thickness at the edge portion, and wherein the first thickness is set to be larger than the second thickness.

2. The card-type holographic recording medium according to claim 1, further comprising a wavelength adjusting layer formed over a surface of the second substrate opposite from a surface which contacts the holographic recording layer.

3. The card-type holographic recording medium according to claim 2, wherein the wavelength adjusting layer reflects a light having a first wavelength and transmits light having a second wavelength, the first wavelength and the second wavelength differing by about 250 nm or more.

4. The card-type holographic recording medium according to claim 1, further comprising a reflecting-layer-mounted address-pit formed over a surface of the second substrate opposite from a surface which contacts the holographic recording layer.

5. The card-type holographic recording medium according to claim 1, wherein an oxygen shielding layer is formed on one or both of the first substrate and the second substrate.

6. The card-type holographic recording medium according to claim 1, wherein the holographic recording layer comprises an organic photopolymer.

7. The card-type holographic recording medium according to claim 6, wherein the organic photopolymer is comprised of a free-radical polymerization compound, an optical-radical polymerization initiator, and a matrix material.

8. The card-type holographic recording medium according to claim 6, wherein the organic photopolymer is comprised of at least one of an acid-forming agent, a radical-forming agent, a pigment, an oligomer, or a volume expanding agent.

9. The card-type holographic recording medium according to claim 8, wherein the total wt. % of the at least one of an acid-forming agent, a radical-forming agent, a pigment, an oligomer, or a volume expanding agent in the holographic recording layer is from about 0.001 wt % to about 0.1 wt %.

10. The card-type holographic recording medium according to claim 1, wherein a space between the first face of the first substrate and the second face of the second substrate has a thickness from about 1 nm to about 200 nm.

11. The card-type holographic recording medium according to claim 1, wherein the holographic recording layer fills about 99.5% or less of a volume between the first face of the first substrate and the second face of the second substrate.

12. The card-type holographic recording medium according to claim 1, wherein the void comprises at least one of air, nitrogen, or a noble gas.

13. The card-type holographic recording medium according to claim 1, having a circular shape, a triangular shape, a square shape, a rectangular shape, a partially circular-partially straight edge shape, or a hexagonal shape.

14. The card-type holographic recording medium according to claim 1, having a surface area of about 1 cm2 to about 400 cm2.

15. The card-type holographic recording medium according to claim 1, having a surface area of about 4 cm2 to about 100 cm2.

16. The card-type holographic recording medium according to claim 1, wherein the holographic recording layer is formed from a precursor solution.

17. The card-type holographic recording medium according to claim 16, wherein the precursor solution is cured under room temperature to form the holographic recording layer.

18. The card-type holographic recording medium according to claim 16, wherein the precursor solution is cured by heat to form the holographic recording layer.

19. The card-type holographic recording medium according to claim 16, wherein the precursor solution is cured to form the holographic recording layer and the resulting holographic recording layer has a volume less than the precursor solution from which the holographic recording layer was formed.

* * * * *